(12) United States Patent
Hwang et al.

(10) Patent No.: US 8,195,846 B2
(45) Date of Patent: Jun. 5, 2012

(54) DIRECT MEMORY ACCESS CONTROLLER FOR IMPROVING DATA TRANSMISSION EFFICIENCY IN MMOIP AND METHOD THEREFOR

(75) Inventors: In-Ki Hwang, Daejeon (KR); Do-Young Kim, Daejeon (KR); Byung-Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 65 days.

(21) Appl. No.: 12/746,565

(22) PCT Filed: Oct. 1, 2008

(86) PCT No.: PCT/KR2008/005766
§ 371 (c)(1),
(2), (4) Date: Jun. 7, 2010

(87) PCT Pub. No.: WO2009/078559
PCT Pub. Date: Jun. 25, 2009

(65) Prior Publication Data
US 2010/0262728 A1    Oct. 14, 2010

(30) Foreign Application Priority Data
Dec. 17, 2007  (KR) .......................... 10-2007-0132732

(51) Int. Cl.
*G06F 13/28* (2006.01)
*G06F 13/20* (2006.01)
(52) U.S. Cl. ........................................... 710/25; 710/28
(58) Field of Classification Search .................... 710/25, 710/28
See application file for complete search history.

(56) References Cited

U.S. PATENT DOCUMENTS

| 6,378,083 | B1 | 4/2002 | Yamanaka et al. | |
| 6,441,290 | B2* | 8/2002 | Fujita et al. ................ | 84/603 |
| 2005/0228630 | A1* | 10/2005 | Tseng et al. ................ | 703/19 |
| 2008/0133793 | A1* | 6/2008 | Hwang et al. ............... | 710/35 |

FOREIGN PATENT DOCUMENTS

| JP | 2005-025724 A | 1/2005 |
| KR | 1020040097453 A | 11/2004 |
| KR | 1020060106142 A | 10/2006 |
| KR | 1020070061240 A | 6/2007 |
| KR | 1020070098896 A | 10/2007 |

OTHER PUBLICATIONS

International Search Report: PCT/KR2008/005766.

\* cited by examiner

*Primary Examiner* — Chun-Kuan Lee
*Assistant Examiner* — Zachary K Huson
(74) *Attorney, Agent, or Firm* — Ladas & Parry LLP

(57) ABSTRACT

A direct memory access controller (DMAC) for improving data transmission efficiency in multi-media over internet protocol (MMoIP) and a method therefor are provided. The DMAC requests and obtains a bus control right by determining that a DMA request signal is generated not only when a DMA request signal of a module for processing data in MMoIP is received but also when an operation of a timer operating during a predetermined period set considering periodicity of data in MMoIP is completed. Thus, the time taken to request a bus control right in a conventional DMAC can be reduced, thereby improving data transmission efficiency in MMoIP.

16 Claims, 7 Drawing Sheets

DIRECT MEMORY ACCESS CONTROLLER FOR IMPROVING DATA TRANSMISSION EFFICIENCY IN MMOIP AND METHOD THEREFOR

TECHNICAL FIELD

The present invention relates to data transmission in multi-media over Internet protocol (MMoIP), and more particularly, to a direct memory access controller (DMAC) for improving data transmission efficiency in MMoIP and a method therefor.

BACKGROUND ART

Multi-media over Internet protocol (hereinafter, referred to as 'MMoIP') periodically processes a predetermined amount of data for certain period of time depending on the type of CODEC. When data processing relies on a central processing unit (hereinafter, referred to as a 'CPU'), the CPU takes charge of even simple operations for transferring data, which results in degradation of system performance. A direct memory access controller (hereinafter, referred to as 'DMAC') is used to solve such a problem. The DMAC performs the operation of acquiring a bus control right from the CPU based on respective channel information initially determined, and transferring a burst size from a target module (e.g., a memory) to a destination module (e.g., a memory). The operation is repeated until a total amount of transmitted data reaches an initially determined total size.

DISCLOSURE OF INVENTION

Technical Problem

The present invention provides a method and apparatus for improving data transmission efficiency in MMoIP by reducing a request time of a bus control right in a DMAC.

Technical Solution

According to an aspect of the present invention, there provided a direct memory access controller (DMAC), comprising: a timer operating during a predetermined period from the moment a bus control right is obtained; a DMA request determining unit for determining whether or not an operation of the timer is completed and whether or not a direct memory access (DMA) request signal of an external module is received; a bus control right obtaining unit for requesting and obtaining the bus control right based on whether or not the DMA operation is completed and whether or not the DMA request signal is received; and a data transmitting unit for transmitting data through a DMA scheme.

According to another aspect of the present invention, there is provided a method of improving data transmission efficiency in a DMAC, the method comprising: determining whether or not an operation of a timer is completed and whether or not a DMA request signal of an external module is received; requesting and obtaining a bus control right based on whether or not the DMA operation is completed and whether or not the DMA request signal is received; operating the timer during a predetermined period when obtaining the bus control right; and transmitting data through a DMA scheme.

According to another aspect of the present invention, there is provided a method of improving data transmission efficiency in a DMAC, the method comprising: stopping transmission of data when a hold signal is received during transmission of the data through a DMA scheme; setting a size obtained by subtracting the size of data transmitted until the hold signal from a burst size for transmitting as a new burst size; and storing information of a channel used in the transmission of the data having the new burst size.

According to another aspect of the present invention, there is provided an apparatus for improving data transmission efficiency, the apparatus comprising: a dedicated DMAC for requesting a bus control right when an operation of a timer operating during a predetermined period is completed or when a DMA request signal is received; a nondedicated DMAC for requesting a bus control right when the DMA request signal is received; and an arbiter for generating a hold signal for stopping an DMA operation of the nondedicated DMAC when a request for the bus control right of the dedicated DMAC is generated, and then transferring the bus control right to the dedicated DMAC.

Advantageous Effects

According to the present invention, when a dedicated DMAC is used for processing audio/video data in MMoIP, the time requested for DMA can be reduced using periodicity of the audio/video data. In addition, a dedicated DMAC for processing audio/video data is used such that a bus control right of a current bus master is transferred to the dedicated DMAC when a request for the bust control right is generated, thereby reducing the time for processing the audio/video data.

DESCRIPTION OF DRAWINGS

The above and other features and advantages of the present invention will become more apparent by describing in detail exemplary embodiments thereof with reference to the attached drawings in which.

BEST MODE

According to an aspect of the present invention, there provided a direct memory access controller (DMAC), comprising: a timer operating during a predetermined period from the moment a bus control right is obtained; a DMA request determining unit for determining whether or not an operation of the timer is completed and whether or not a direct memory access (DMA) request signal of an external module is received; a bus control right obtaining unit for requesting and obtaining the bus control right based on whether or not the DMA operation is completed and whether or not the DMA request signal is received; and a data transmitting unit for transmitting data through a DMA scheme.

According to another aspect of the present invention, there is provided a method of improving data transmission efficiency in a DMAC, the method comprising: determining whether or not an operation of a timer is completed and whether or not a DMA request signal of an external module is received; requesting and obtaining a bus control right based on whether or not the DMA operation is completed and whether or not the DMA request signal is received; operating the timer during a predetermined period when obtaining the bus control right; and transmitting data through a DMA scheme.

According to another aspect of the present invention, there is provided a method of improving data transmission efficiency in a DMAC, the method comprising: stopping transmission of data when a hold signal is received during transmission of the data through a DMA scheme; setting a size obtained by subtracting the size of data transmitted until the hold signal from a burst size for transmitting as a new burst size; and storing information of a channel used in the transmission of the data having the new burst size.

According to another aspect of the present invention, there is provided an apparatus for improving data transmission efficiency, the apparatus comprising: a dedicated DMAC for requesting a bus control right when an operation of a timer operating during a predetermined period is completed or when a DMA request signal is received; a nondedicated DMAC for requesting a bus control right when the DMA request signal is received; and an arbiter for generating a hold signal for stopping an DMA operation of the nondedicated DMAC when a request for the bus control right of the dedicated DMAC is generated, and then transferring the bus control right to the dedicated DMAC.

Mode for Invention

Hereinafter, a method of and apparatus for improving data transmission efficiency in multi-media over internet protocol (MMoIP) according to embodiments of the present invention will now be described more fully with reference to the accompanying drawings.

Figure 1:
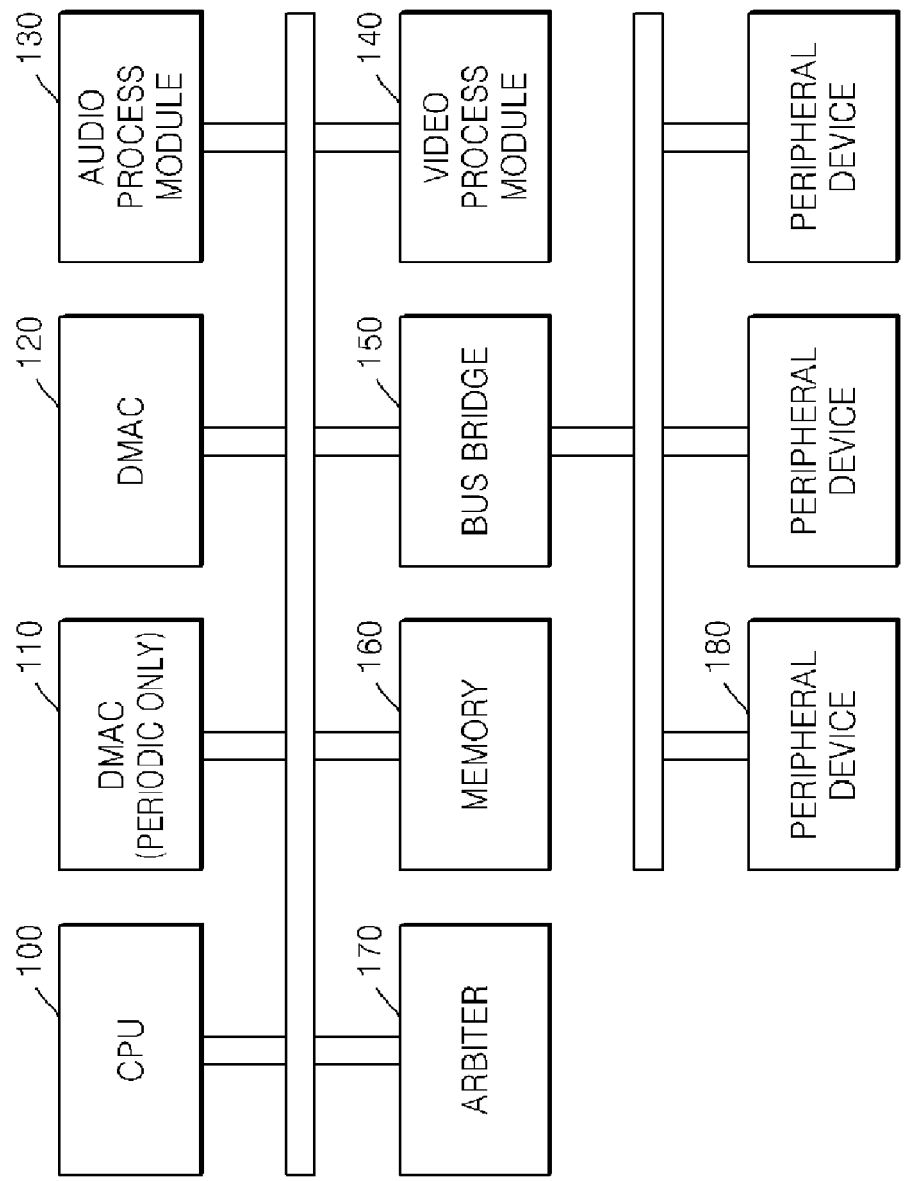
FIG. 1 is a block diagram illustrating the configuration of a system for improving data transmission efficiency in MMoIP, according to an embodiment of the present invention.

FIG. 1 is a block diagram illustrating the configuration of a system for improving data transmission efficiency in MMoIP, according to an embodiment of the present invention;

Referring to FIG. 1, the system according to the present embodiment of the present invention includes a central processing unit (CPU) 100, two direct memory access controllers (DMACs) 110 and 120, audio/video processing modules 130 and 140 for MMoIP, a bus bridge 150 for connection between buses, a memory 160, an arbiter 170 for arbitrating a bus control right, and various types of peripheral devices 180. The DMACs 110 and 120 have storage media having a smaller size than the memory 160, and the storage media have a first in first out (FIFO) structure.

The direct memory access controller (DMAC) 110 is dedicatedly used for modules for processing periodic data (e.g., the audio/video processing modules). Hereinafter, the direct memory access controller (DMAC) 110 is referred to as a 'dedicated DMAC', and the direct memory access controller (DMAC) 120 is referred to as a 'non-dedicated DMAC'. The dedicated DMAC 110 receives a bus control right from the arbiter 170 by estimating a time when a DMA request signal for processing data of the audio and video processing modules 130 and 140 is generated, using a periodicity of audio/video data in the MMoIP.

The system illustrated in FIG. 1 is only an embodiment for illustrating operational features of the dedicated DMAC 110, according to the present invention. It will be apparent that the dedicated DMAC 110 according to the present invention may be equally applied to other systems.

Figure 2:
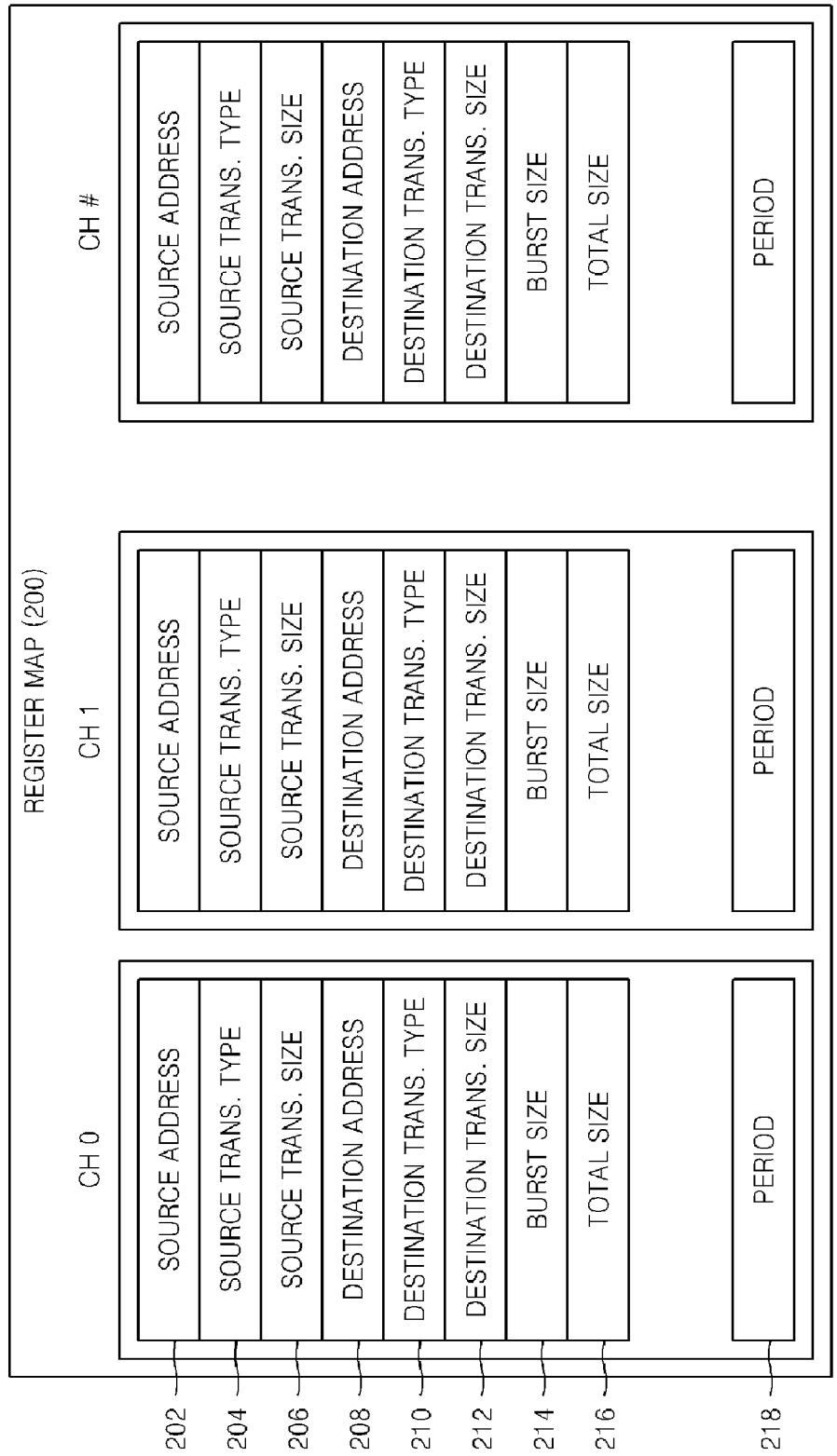
FIG. 2 is a view illustrating an example of a register map for each channel in the DMAC, according to an embodiment of the present invention.

FIG. 2 is a view illustrating an example of a register map for each channel in the DMAC 110 or 120, according to an embodiment of the present invention.

Referring to FIG. 2, the DMAC 110 or 120 (the dedicated or nondedicated DMAC), in which a plurality of channels exist, includes a register map 200 for storing information for each channel. A register for each channel includes a source address 202, a source transformation type 204, a source transformation size 206, a destination address 208, a destination transformation type 210, a destination transformation size 212, a burst size 214, a total size 216, and a period 218. The register for each channel in FIG. 2 includes a register in which a period for the dedicated DMAC (110 of FIG. 1) according to the present embodiment of the present invention is stored.

Figure 3:
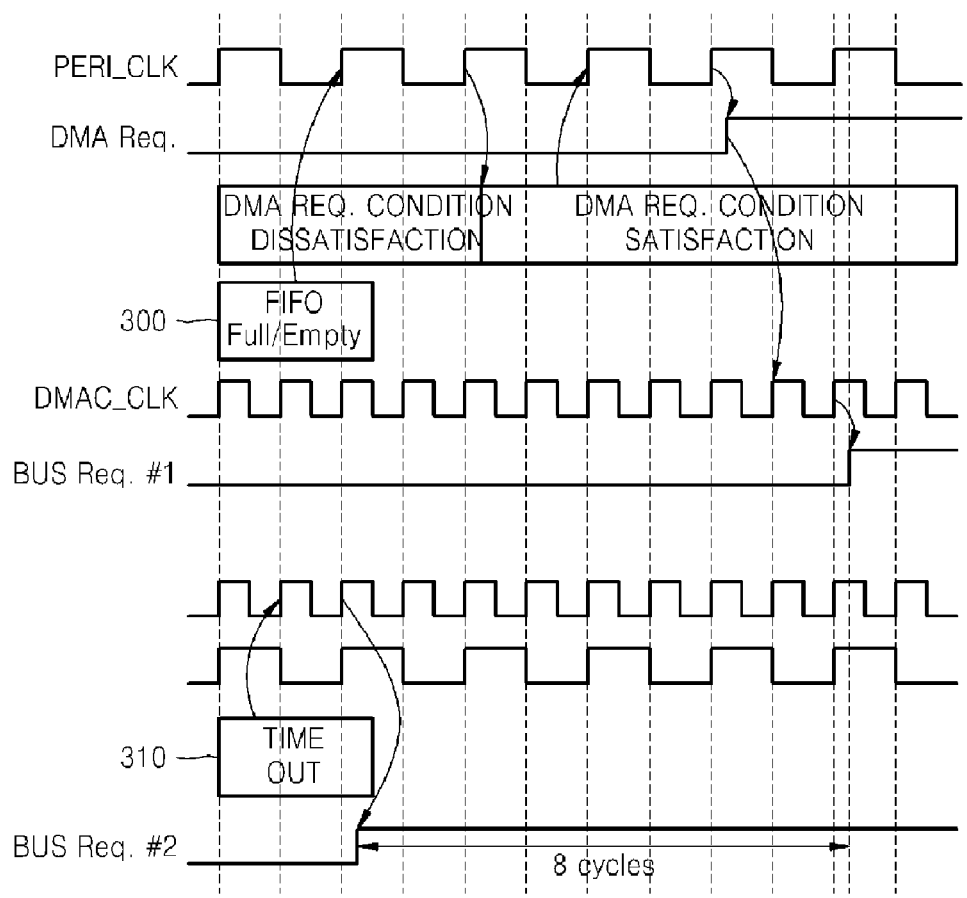
FIG. 3 is a view illustrating a timing diagram of the DMAC, according to an embodiment of the present invention.

FIG. 3 is a view illustrating a timing diagram of the DMAC 110, according to an embodiment of the present invention.

Referring to FIGS. 1 and 3, the timing diagram of the DMAC 110 will be described based on a clock PERI_CLK which is provided to the audio processing module 130. It takes 9 cycles (based on DMAC_CLK) until a signal BUS_Req #1 for requesting a bus right from the arbiter 170 in a conventional DMAC is generated due to an occurrence of event FIFO Full/Empty 300. This is because the audio processing module 130 or the DMAC is operated as a synchronizing circuit. That is, when an event occurs, an operation for the event is generated after at least one clock.

However, the dedicated DMAC 110 according to the present embodiment of the present invention estimates a time when a DMA request signal DMA-Req of the audio/video processing module 130 or 140 is generated using TIME OUT 310 of a self-timer, so that the dedicated DMAC 110 can reduce a time taken until a signal BUS_Req #2 for requesting a bus control right from the arbiter 170 is generated by 8 cycles (based on DMAC_CLK) or more as compared to the conventional DMAC.

Figure 4:
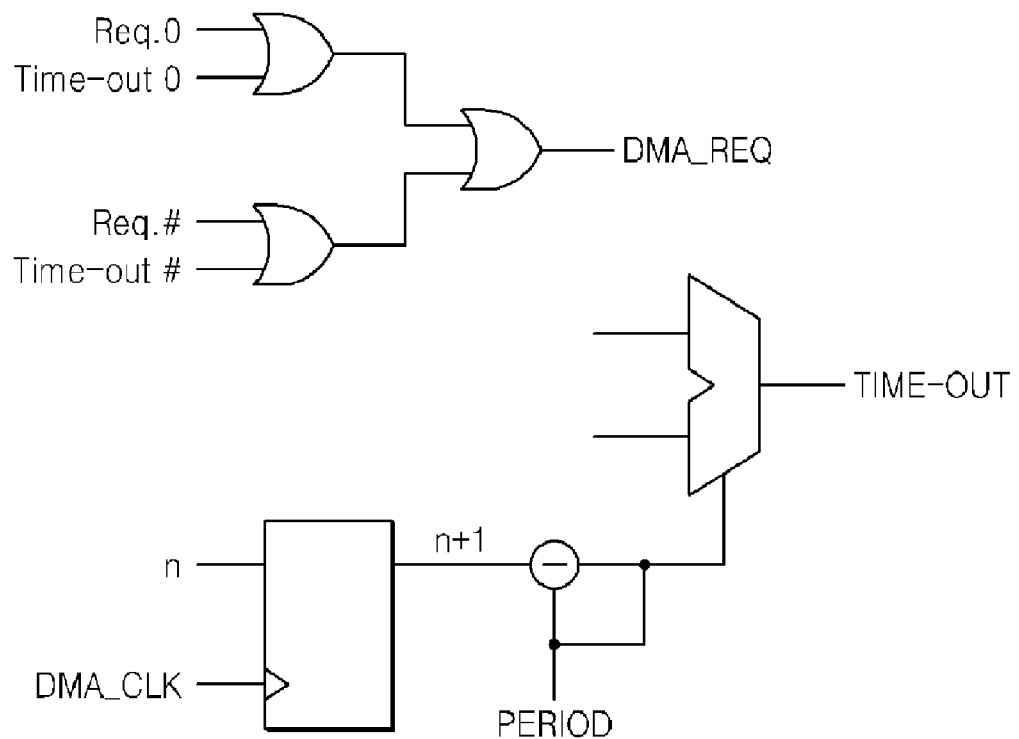
FIG. 4 is a view illustrating a control logic of a dedicated DMAC for estimating DMA request signals, according to an embodiment of the present invention.

FIG. 4 is a view illustrating a control logic of a dedicated DMAC for estimating DMA request signals, according to an embodiment of the present invention.

Referring to FIGS. 1 and 4, a DMA request signal DMA_REQ is generated when signal DMA_REQ # inputted to a corresponding channel of the dedicated DMAC 110 or signal Time-out # of the self-timer is activated. That is, a result obtained by performing an OR operation with respect to the signal DMA_REQ # inputted to the corresponding channel and the signal Time-out # becomes the DMA request signal DMA_REQ. Here, the signal DMA_REQ # refers to a DMA request signal generated from an audio/video processing module 130 or 140 and then inputted to a corresponding channel (#), and the signal Time-out # refers to a signal generated in Time-out of a timer activated depending on a predetermined condition in the dedicated DMAC 110. Specifically, the activation of the signal Time-out # is generated when the value obtained by subtracting the period (218 of FIG. 2) inputted in the initial register map (see FIG. 2) by 1 for each operation of DMAC_CLK becomes '0'.

Figure 5:
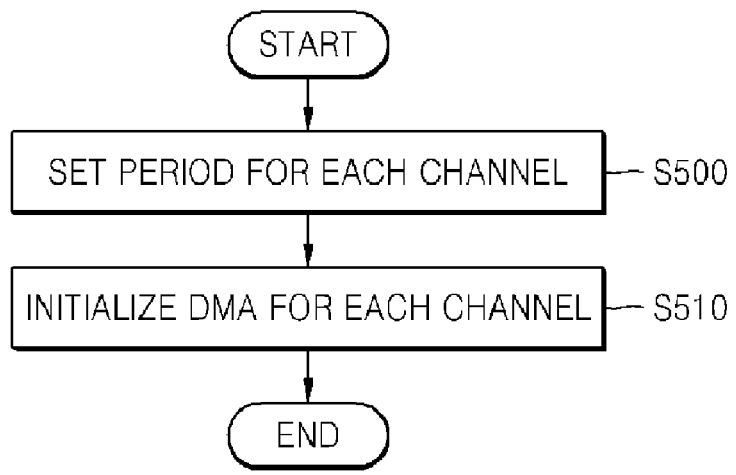
FIG. 5 is a flowchart illustrating a channel initialization process in the dedicated DMAC, according to an embodiment of the present invention.

FIG. 5 is a flowchart illustrating a channel initialization process in the dedicated DMAC, according to an embodiment of the present invention.

Referring to FIGS. 1 and 5, the dedicated DMAC 110 sets a period for each channel (S500). The dedicated DMAC 110 includes a plurality of input/output channels. As an example of channels for MMoIP, the dedicated DMAC 110 includes four channels, i.e., audio data input/output and video data input/out. The dedicated DMAC 110 stores a period of each channel in a register map (see FIG. 2) (S510).

For example, it is assumed that the dedicated DMAC 110 is operated at a clock of 133 MHz, an audio data is processed at a sampling rate of 16 bit/16 KHz per 8 bytes, the total size (216 of FIG. 2) of transmission data using DMA is 640 bytes (20 msecs), the size of FIFO for storing audio data is 2byte*8, and a DMA request occurs when FIFO depth>=4. Then, the period (218 of FIG. 2) stored in the register map is ($1/16$ KHz*4)/($1/133$ MHz)=8.33*103. In the DMAC, it is assumed that a DMA request signal is generated when the value obtained by subtracting the period by 1 for each clock becomes '0' after a timer is operated.

Figure 6:
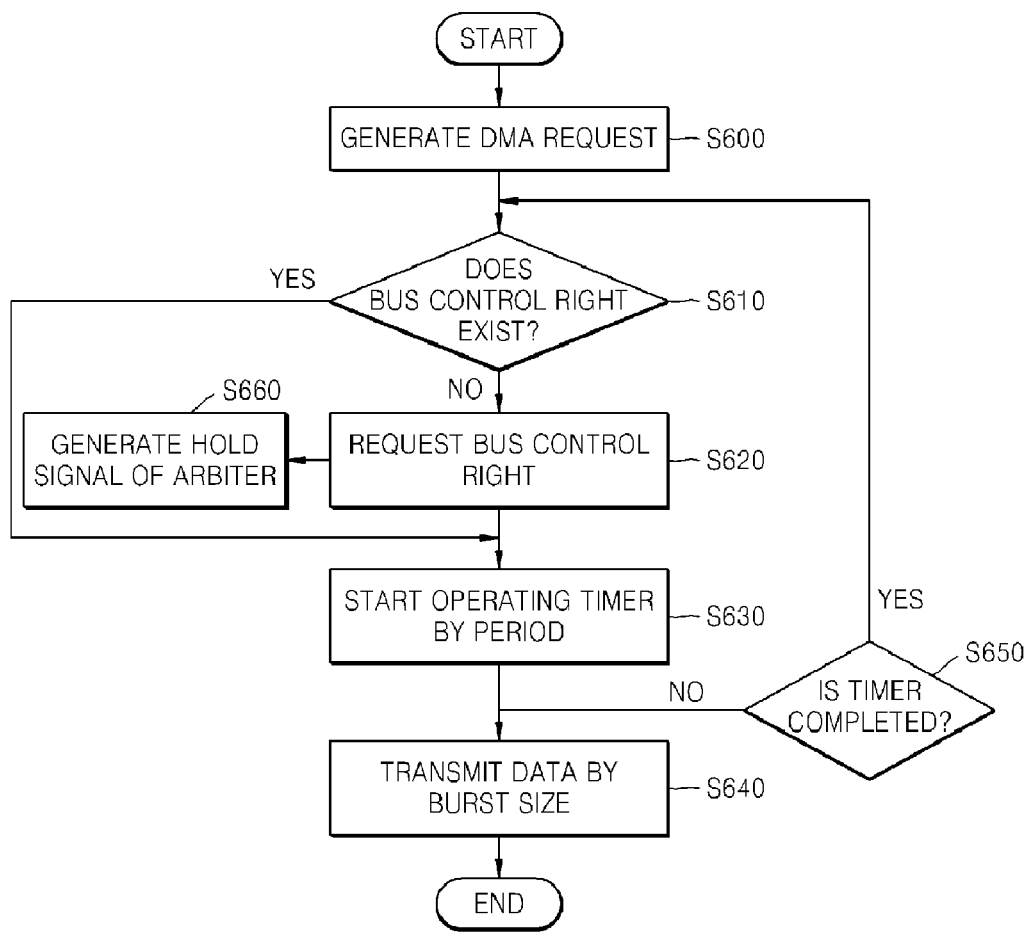
FIG. 6 is a flowchart illustrating a method of improving data transmission efficiency using the dedicated DMAC, according to an embodiment of the present invention.

FIG. 6 is a flowchart illustrating a method of improving data transmission efficiency using the dedicated DMAC 110, according to an embodiment of the present invention.

Referring to FIGS. 1 and 6, if a DMA request is generated, the dedicated DMAC 110 determines whether or not a bus control right exists in the dedicated DMAC 110 (S610). The dedicated DMAC 110 receives a DMA request signal from data processing modules (e.g., audio/video processing modules) and determines that the DMA request signal is generated. In addition, the dedicated DMAC 110 determines that the DMA request signal is generated even when a self-timer is completed (S650).

If a bus control right does not exist in the dedicated DMAC 110 (S610), the dedicated DMAC 110 requests a bus control right from the arbiter 170 to obtain the bus control right (S620). If a master module preoccupying the bus control right does not exist by searching a current bus state, the arbiter 170 that receives a request for the bus control right transfers the bus control right to the dedicated DMAC 110. If a master module preoccupying the bust control right exists, the arbiter 170 generates a hold signal to the corresponding master module (S660) to stop the current operation and then transfers the bus control right. For example, if a hold signal is generated, the CPU 100 performs the same operation as a conventional operation where the conventional DMAC (i.e., the nondedicated DMAC 120) transfers a bus control right when a request signal for the bus control right is generated. The nondedicated DMAC 120 temporarily stops the DMA operation that is pre-reserved and performed. The operation of the non-dedicated DMAC 120 will be described in detail with reference to FIG. 7.

The dedicated DMAC 110 obtaining the bus control right operates the timer set by a time corresponding to the period stored in the register map (S630), and transmits data based on information (address, burst size, total size, period and the like) of a channel in which the DMA request signal is generated (S640). In FIG. 5, the time when Time-out is generated in the timer is $1/16$ KHz*4, which is a time when the next DMA_REQ is generated in the audio processing module.

Figure 7:
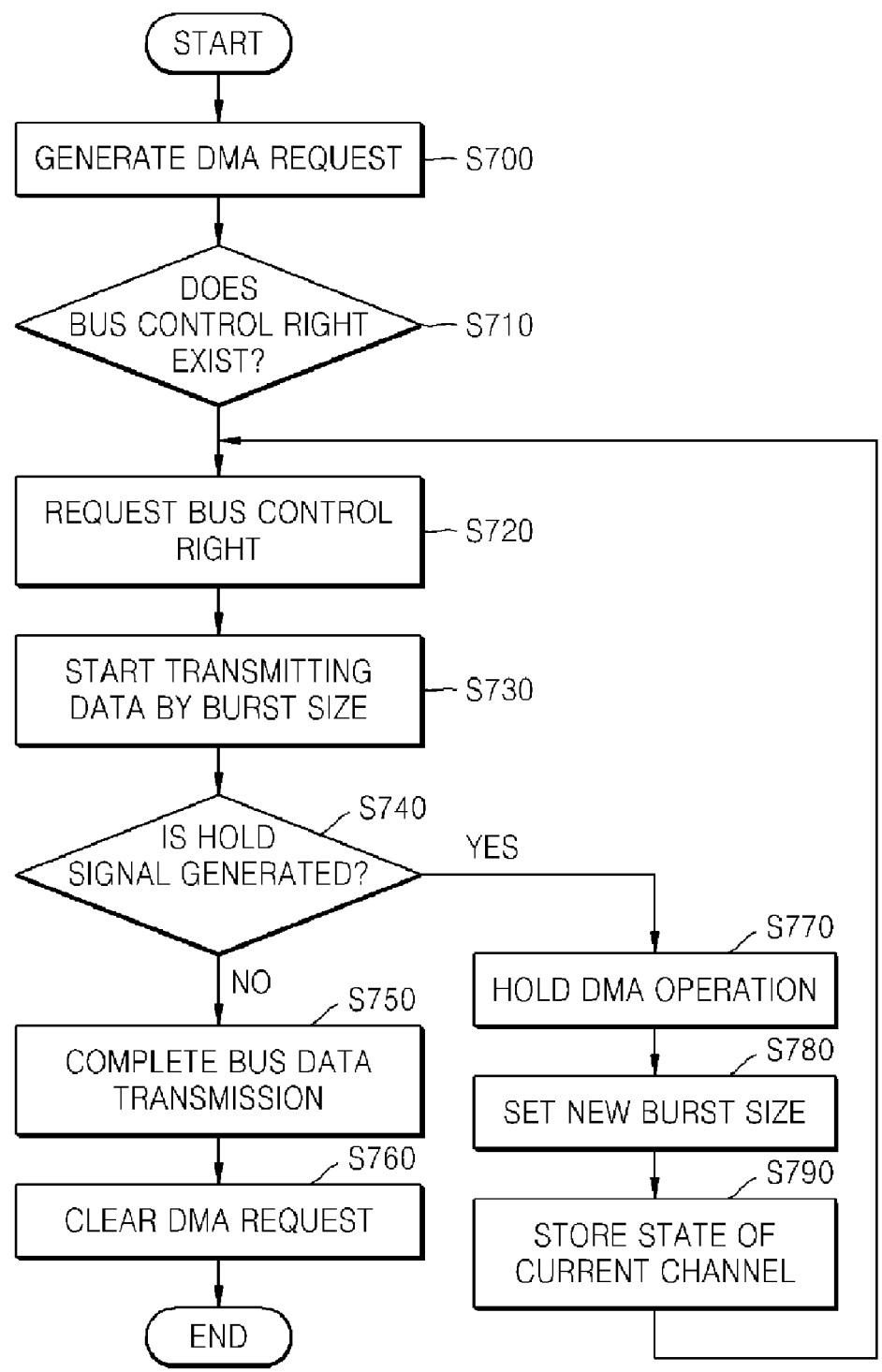
FIG. 7 is a flowchart illustrating a method of improving data transmission efficiency using a nondedicated DMAC, according to an embodiment of the present invention.

FIG. 7 is a flowchart illustrating a method for improving data transmission efficiency using the nondedicated DMAC 120, according to an embodiment of the present invention.

Referring to FIGS. 1 and 7, if a DMA request signal is generated from a target module (a module except a module controlled by the dedicated DMAC 110) required for DMA transmission (S700), the nondedicated DMAC 120 determines whether or not a bus control right exists (S710). If a bus control right does not exist, the non-dedicated DMAC 120 requests a bus control right from the arbiter 170 based on the DMA request signal generated in the target module (S720).

If the current bus state is in an idle state, the arbiter 170 transfers the bus control right to the nondedicated DMAC 120. The nondedicated DMAC 120 acquiring the bus control right sets a channel requested for DMA as an operation channel and transmits a data by the burst size from the target in the corresponding channel to the destination based on initial channel information stored in the register map (see FIG. 2) (S730). If the size of the transmitted data (i.e., the burst size) is smaller than the total data size (i.e., burst size<total data size), the nondedicated DMAC 120 adjusts the total data size with a value obtained by subtracting the burst size from the total data size (i.e., total data size=total data size−burst size) and then transfers the bus control right to the CPU (S670). Such a process is repeated when the total data size is '0'. If the total data size is '0', the nondedicated DMAC 120 generates an interruption so that the CPU can recognize that data transmission is completed.

If a hold signal of the arbiter 170 is generated during the DMA operation of the non-dedicated DMAC 120 (S740), the nondadicated DMAC 120 holds the current DMA operation (S770). The burst size stored in a register of the nondedicated DMAC 120 for each channel is changed depending on the current state (S780). That is, the value obtained by subtracting the size of the currently transmitted data from the burst size stored in the register for each channel is stored as a new burst size. This is to be connected to the previous operation when the nondedicated DMAC 120 receives the bus control right again. The nondedicated DMAC 120 stores the changed information (address, size and the like) of the channel in the register map (S790).

Figure 8:
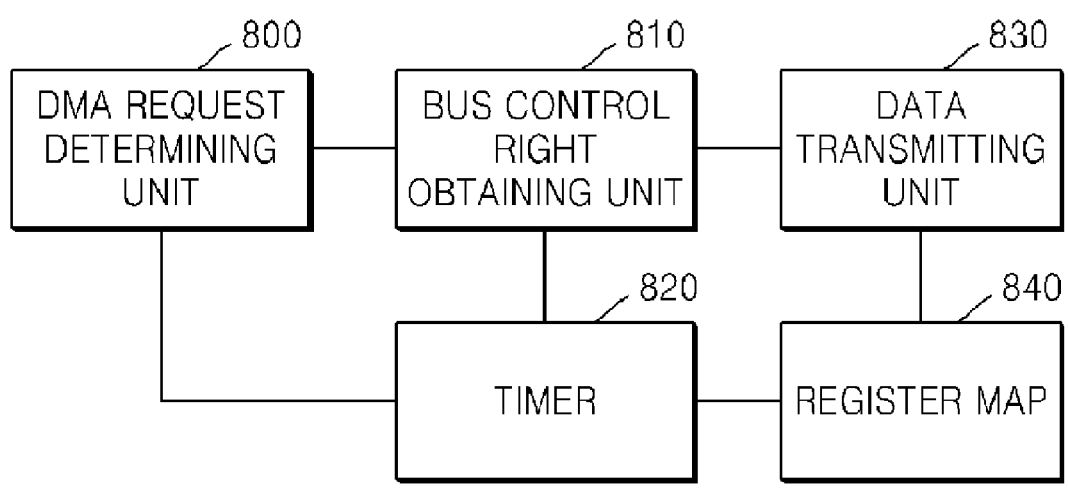
FIG. 8 is a block diagram illustrating the configuration of a dedicated DMAC, according to an embodiment of the present invention.

FIG. 8 is a block diagram illustrating the configuration of a dedicated DMAC, according to an embodiment of the present invention.

Referring to FIG. 8, the dedicated DMAC includes a DMA request determining unit 800, a bus control right obtaining unit 810, a timer 820, a data transmitting unit 830, and a register map 840.

The DMA request determining unit 800 determines that a DMA request signal inputted to a corresponding channel exists, or that the timer 820 is expired, ie. Time-out. A control logic for generating the DMA request signal is illustrated in FIG. 5.

If it is determined that the DMA request signal is generated by the DMA request determining unit 800, the bus control right obtaining unit 810 requests a bus control right from an arbiter. The arbiter holds the operation of another master module (e.g., a non-dedicated DMAC) using a bus and then transfers the bus control right to a dedicated DMAC.

If the bus control right is obtained, the timer 820 is operated for a time corresponding to the period of a corresponding channel stored in the register map 840. If the timer 820 is finished, the DMA request determining unit 800 determines that the DMA request signal is generated as described above.

The data transmitting unit 830 transmits data through DMA according to the burst size stored in the register map 840.

In the present invention, recording media readable by a computer may be implemented with codes readable by the computer. The recording media readable by a computer includes all types of recording devices in which data readable by a computer system are stored. For example, the recording media readable by a computer are ROMs, RAMs, CD-ROMs, magnetic tapes, floppy disks, optical data storage devices and the like. In addition, the recording media readable by a computer may be implemented in the form of display by carrier waves (e.g., transmission on the Internet). The recording media readable by a computer are distributed in a computer system connected through networks such that codes readable by a computer through the distribution scheme can be stored and implemented.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A direct memory access controller (DMAC), comprising:
a timer operating during a predetermined period from the moment a bus control right is obtained;
a dedicated and a nondedicated DMA request determining unit for determining whether or not an operation of the timer is completed and whether or not a direct memory access (DMA) request signal of an external module is received, wherein the dedicated DMA request determining unit for estimating a time when the DMA request signal is generated by using a time-out signal of the timer to reduce a time taken to respond to the DMA request signal relative to a response time of the nondedicated DMA request determining unit;
a bus control right obtaining unit for requesting and obtaining the bus control right based on whether or not the DMA operation is completed and whether or not the DMA request signal is received; and
a data transmitting unit for transmitting data through a DMA scheme.

2. The DMAC of claim 1, wherein the dedicated DMA request determining unit performs an OR operation with respect to the time-out signal generated when the operation of the timer is completed and the DMA request signal is received in a channel.

3. The DMAC of claim 1, further comprising a register map for storing a period for the operation of the timer for each channel.

4. The DMAC of claim 1, wherein the period is set considering periodicity of data in multi-media over internet protocol (MMoIP).

5. A method of improving data transmission efficiency in a dedicated DMAC, the method comprising:
determining whether or not an operation of a timer is completed and whether or not a DMA request signal of an external module is received;
estimating a time, by the dedicated DMAC, when the DMA request signal is generated by using a time-out signal of the timer to reduce a time taken to respond to the DMA request signal in a dedicated DMAC relative to a response time of a nondedicated DMAC;
requesting and obtaining a bus control right based on whether or not the DMA operation is completed and whether or not the DMA request signal is received;
operating the timer during a predetermined period when obtaining the bus control right; and
transmitting data through a DMA scheme.

6. The method of claim 5, wherein the determining of a DMA request further comprises performing an OR operation, by the dedicated DMAC, with respect to a time-out signal generated when the operation of the timer is completed and the DMA request signal received in a channel.

7. The method of claim 5, further comprising:
setting a period for the time for each channel; and
storing the period in a register map for each channel.

8. The method of claim 6, wherein the setting of the period comprises setting the period considering periodicity of data in MMoIP.

9. The method of claim 5, further comprising:
stopping transmission of data when a hold signal is received during transmission of the data through the DMA scheme;
setting a size obtained by subtracting the size of data transmitted until the hold signal from a burst size for transmitting as a new burst size; and
storing information of a channel used in the transmission of the data having the new burst size.

10. The method of claim 9, wherein the storing of the information of the channel comprises storing the information of the channel in a register map in which information for each channel is stored.

11. An apparatus for improving data transmission efficiency, the apparatus comprising:
a dedicated DMAC for requesting a bus control right when an operation of a timer operating during a predetermined period is completed or when a DMA request signal is received;
a nondedicated DMAC for requesting a bus control right when the DMA request signal is received, wherein the dedicated DMAC configured to estimate a time when the DMA request signal is generated by using a time-out signal of a timer and to respond to the DMA request signal faster than the nondedicated DMAC; and
an arbiter for generating a hold signal for stopping an DMA operation of the nondedicated DMAC when a request for the bus control right of the dedicated DMAC is generated, and then transferring the bus control right to the dedicated DMAC.

12. The apparatus of claim 11, wherein the dedicated DMAC receives the DMA request signal from a module for processing data in MMoIP or requests the bus control right when the operation of the timer is completed.

13. The apparatus of claim 11, wherein the dedicated DMAC sets the period of the timer considering periodicity of data in MMoIP.

14. An apparatus for improving data transmission efficiency, the apparatus comprising:
a plurality of peripheral devices coupled to a bus bridge;
an arbiter coupled to the bus bridge and the peripheral devices, the arbiter for generating a hold signal for stopping an DMA operation of a nondedicated DMAC when a request from one of the peripheral devices for a bus control right of the dedicated DMAC is generated, and then the arbiter for transferring the bus control right to the dedicated DMAC;
the nondedicated DMAC for requesting the bus control right when the DMA request signal is received; and
a dedicated DMAC for requesting the bus control right when an operation of a timer during a predetermined period is completed or when a DMA request signal is received, wherein the dedicated DMAC for estimating a time when the DMA request signal is generated by using a time-out signal of a timer and for responding to the DMA request signal faster than the nondedicated DMAC.

15. The apparatus of claim 14, wherein the dedicated DMAC receives the DMA request signal from a module for processing data in MMoIP or requests the bus control right when the operation of the timer is completed.

16. The apparatus of claim 14, wherein the dedicated DMAC sets the period of the timer considering periodicity of data in MMoIP.

* * * * *